(12) United States Patent
Christensen et al.

(10) Patent No.: US 12,330,966 B2
(45) Date of Patent: Jun. 17, 2025

(54) DEIONIZATION SYSTEM WITH HEAT MANAGEMENT

(71) Applicant: Robert Bosch GmbH, Stuttgart (DE)

(72) Inventors: Jake Christensen, Elk Grove, CA (US); Münir M. Besli, San Jose, CA (US); Saravanan Kuppan, San Jose, CA (US); Sondra Hellstrom, East Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 731 days.

(21) Appl. No.: 17/458,804

(22) Filed: Aug. 27, 2021

(65) Prior Publication Data

US 2023/0063865 A1   Mar. 2, 2023

(51) Int. Cl.
  *C02F 1/469* (2023.01)
  *C02F 1/00* (2023.01)
  *C02F 1/461* (2023.01)
  *C02F 103/08* (2006.01)

(52) U.S. Cl.
  CPC ............ *C02F 1/4691* (2013.01); *C02F 1/008* (2013.01); *C02F 1/46104* (2013.01); *C02F 2103/08* (2013.01); *C02F 2201/46115* (2013.01); *C02F 2201/4612* (2013.01); *C02F 2201/46155* (2013.01); *C02F 2209/02* (2013.01); *C02F 2209/05* (2013.01); *C02F 2301/046* (2013.01)

(58) Field of Classification Search
  None
  See application file for complete search history.

(56) References Cited

U.S. PATENT DOCUMENTS

| | | | |
|---|---|---|---|
| 6,780,328 B1 | 8/2004 | Zhang | |
| 10,793,450 B2 | 10/2020 | Gao et al. | |
| 10,988,391 B2 | 4/2021 | Kim et al. | |
| 2005/0103717 A1 | 5/2005 | Jha et al. | |
| 2010/0006438 A1* | 1/2010 | Antich | B82Y 30/00 |
| | | | 204/522 |
| 2012/0118722 A1* | 5/2012 | Holtzapple | F28F 19/02 |
| | | | 165/172 |
| 2014/0251806 A1 | 9/2014 | Larson et al. | |
| 2020/0123027 A1 | 4/2020 | Kornbluth et al. | |
| 2020/0123028 A1 | 4/2020 | Kim et al. | |

(Continued)

FOREIGN PATENT DOCUMENTS

| CN | 101160264 A | 4/2008 |
|---|---|---|
| JP | 2013117399 A | 6/2013 |

(Continued)

OTHER PUBLICATIONS

International Search Report issued in PCT/US2022/041683, dated Dec. 15, 2022, 3 pages.

(Continued)

*Primary Examiner* — Louis J Rufo
(74) *Attorney, Agent, or Firm* — Brooks Kushman P.C.

(57) ABSTRACT

An electrochemical deionization system that maintains an operating temperature range of a solution stream (e.g., seawater or brackish water) flowing through the cells of the electrochemical deionization system. Maintaining the operating temperature range is targeted at prolonging the lifetime of the system and increasing the overall performance of the electrochemical deionization system.

20 Claims, 3 Drawing Sheets

(56) References Cited

U.S. PATENT DOCUMENTS

| | | |
|---|---|---|
| 2020/0123029 A1 | 4/2020 | Kornbluth et al. |
| 2020/0131058 A1 | 4/2020 | Kim et al. |
| 2020/0148560 A1 | 5/2020 | Hellstrom et al. |
| 2020/0399149 A1 | 12/2020 | Kim et al. |
| 2021/0039970 A1 | 2/2021 | Metzger et al. |
| 2021/0198124 A1 | 7/2021 | Metzger et al. |

FOREIGN PATENT DOCUMENTS

| | | |
|---|---|---|
| WO | 2007/044609 A1 | 4/2007 |
| WO | 2021079584 A1 | 4/2021 |

OTHER PUBLICATIONS

Kim et al., "Na2FeP2O7 as a Novel Material for Hybrid Capacitive Deionization," Electrochimica Acta, 2016, vol. 203, pp. 265-271, http://dx.doi.org/10.1016/j.electacta.2016.04.056.

Lee et al., "Hybrid capacitive deionization to enhance the desalination performance of capacitive techniques," Energy & Environmental Science, 2014, vol. 7, pp. 3683-3689, DOI: 10.1039/c4ee02378a.

Lee et al., "Rocking Chair Desalination Battery Based on Prussian Blue Electrodes," ACS Omega, 2017, vol. 2, pp. 1653-1659, DOI: 10.1021/acsomega.6b00526.

Smith et al., "Na-Ion Desalination (NID) Enabled by Na-Blocking Membranes and Symmetric Na-Intercalation: Porous-Electrode Modeling," Journal of The Electrochemical Society, 2016, vol. 163, No. 3, pp. A530-A539, DOI: 10.1149/2.0761603jes.

Extended European Search Report for European Application No. 22862139.7 mailed Feb. 26, 2025, 7 pages.

\* cited by examiner

DEIONIZATION SYSTEM WITH HEAT MANAGEMENT

TECHNICAL FIELD

The present disclosure relates to deionization systems with heat management.

BACKGROUND

The demand for fresh, potable water is increasing on the Earth. Therefore, obtaining fresh and drinkable water for human consumption, agriculture, and industrial use is quite important. Removing salt and other impurities from seawater and/or industrial water through a desalination process is one of important technologies to secure fresh water, in addition to thermal (e.g., drying process) and mechanical (e.g., reverse osmosis) processes.

SUMMARY

According to one embodiment, an electrochemical deionization system for removing ions from a solution stream is disclosed. The system includes an upstream cell having at least one upstream compartment including an upstream compartment inlet and an upstream compartment outlet. The at least one upstream component is configured to flow the solution stream between the upstream compartment inlet and the upstream compartment outlet. The system further includes a downstream cell having at least one downstream compartment including a downstream compartment inlet and a downstream compartment outlet. The at least one downstream component is configured to flow the solution stream between the downstream compartment inlet and the downstream compartment outlet. The at least one upstream compartment is in fluid communication with the at least one downstream compartment. The system further includes a first thermal device configured to heat the solution stream before entering the at least one upstream compartment to an elevated temperature. The system also includes a second thermal device configured to cool the solution stream before entering the at least one downstream compartment to a reduced temperature less than the elevated temperature. The reduced and elevated temperatures are in an operating temperature range of the electrochemical deionization system in which one or more electrochemical impedances and one or more degradation mechanisms effects are reduced within the operating temperature range.

According to another embodiment, an electrochemical deionization system for removing ions from a solution stream is disclosed. The system includes an upstream cell having first and second upstream compartments. The first upstream compartment has a first inlet and a first outlet. The first upstream compartment is configured to flow a portion of the solution stream between the first inlet and the first outlet. The second upstream compartment has a first inlet and a first outlet. The second upstream compartment is configured to flow a portion of the solution stream between the first inlet and the first outlet. The system further includes a downstream cell having first and second downstream compartments. The first downstream compartment has a first inlet and a first outlet. The first downstream compartment is configured to flow a portion of the solution stream between the first inlet and the first outlet. The second downstream compartment has a first inlet and a first outlet. The second downstream compartment is configured to flow a portion of the solution stream between the first inlet and the first outlet. The system further includes a first thermal device configured to heat the portion of the solution stream entering the first upstream compartment before entering the first upstream compartment to a first elevated temperature. The system also includes a second thermal device configured to heat the portion of the solution stream entering the second upstream compartment before entering the second upstream component a second elevated temperature. The system also includes a third thermal device configured to cool the portion of the solution stream exiting the first upstream compartment to a first reduced temperature less than the first elevated temperature. The system also includes a fourth thermal device configured to cool the portion of the solution stream exiting the second upstream compartment to a second reduced temperature less than the second elevated temperature. The first and second reduced and elevated temperatures are in an operating temperature range of the electrochemical deionization system in which one or more electrochemical impedances and one or more degradation mechanisms effects are reduced within the operating temperature range.

In yet another embodiment, an electrochemical deionization system for removing ions from a solution stream is disclosed. The system includes a thermal management computer including non-transitory computer-readable medium comprising instructions for thermal management of the electrochemical deionization system that, when executed by a processor, cause the processor to perform operations. The operations include receiving data indicative of a temperature of the solution stream from a downstream temperature sensor of the electrochemical deionization system. The operations further include determining an actual temperature range of the solution stream flowing through the deionization system in response to the data indicative of the temperature of the solution stream and one or more thermal models. The operations also include transmitting upstream and/or downstream thermal signals to upstream and/or downstream thermal devices in response to the actual temperature range to adjust a heating rate and/or a cooling rate of the upstream and/or downstream thermal devices by an adjustment to attempt to maintain the actual temperature range within an operating temperature range of the electrochemical deionization system in which one or more electrochemical impedances and one or more degradation mechanisms effects are reduced within the operating temperature range. The upstream and downstream thermal devices are configured to regulate the temperature of upstream and downstream portions, respectively, of the solution stream.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. These terms may be used to modify any numeric value disclosed or claimed herein. Generally, the term "about" denoting a certain value is intended to denote a range within ±5% of the value. As one example, the phrase "about 100" denotes a range of 100±5, i.e. the range from 95 to 105. Generally, when the term "about" is used, it can be expected that similar results or effects according to the invention can be obtained within a range of ±5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1 to 10 explicitly includes 1, 2, 3, 4, 5, 6, 7, 8, 9, and 10. Similarly, the range 1 to 100 includes 1, 2, 3, 4, ... 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reverse osmosis and thermal distillation are two examples of systems for removing ions from a solution. While both systems are very effective in desalinating saline solutions having high salinity, such as seawater, these systems are associated with relatively high costs and energy consumption. The concentration of dissolved salts in a saline solution having high salinity may be one of the following values or in the range of any two of the following values: 30,000; 31,000; 32,000; 33,000; 34,000; 35,000; 36,000; 37,000; 38,000; 39,000; and 40,000 parts per million. Desalination of saline solutions having lower salinity, such as brackish water, may be accomplished by using electrochemical desalination systems, such as electrodialysis systems or capacitive deionization systems. These systems may treat a saline solution by partial removal of one or more types of ions from a saline solution stream. The concentration of dissolved salts in a saline solution having lower salinity may be one of the following values or in a range of any two of the following values: 1,500; 2,000; 3,000; 4,000; 5,000; 6,000; 7,000; 8,000; 9,000; 10,000; 11,000; 12,000; 13,000; 14,000; and 15,000 parts per million.

Desalination of a water source can be performed by capacitive deionization (CDI) in an electrochemical cell by applying electrical energy to produce a charge separation of ions. A CDI cell therefore typically contains two electrodes, where anion and cations can be stored at the surface of the electrode material via adsorption and/or double layer formation. CDI cells include carbon-based electrodes configured to adsorb ions. Activated carbon materials may be used as substrates to build up an electrochemical double layer when an electric potential is applied. A saline solution stream flowing between a pair of carbon-based electrodes can be desalinated by reducing the number of ions in the solution stream. Upon reversal of the potential between the pair of electrodes or by shorting the circuit creating the electric potential, adsorbed ions are configured to release into a brine solution having a high concentration of dissolved salts through ion desorption.

Another proposal for an electrochemical desalination cell uses a flow-through desalination battery cell configured to intercalate one or more types of ions into a host structure. This type of electrochemical desalination cell may be referred to as intercalative water desalination (IDI) cell. In an IDI cell, two cation-intercalating electrodes alternatively absorb and release cations from/to two separate water streams or reservoirs. Often the two electrodes are symmetric (e.g., same active material and electrode composition, porosity, thickness, etc.). An ion exchange membrane, typically an anion exchange membrane, is placed between these two electrodes and separates two different saltwater compartments, one of which is purified (e.g., ions removed) and the other concentrated (e.g., ions added).

An IDI cell may have one or more benefits over electroadsorption-based electrochemical desalination systems, such as capacitive deionization (CDI) cell, which rely on high surface area electrodes. The surface area of the electrode may be any of the following values or in a range of any two of the following values: 400, 450, 500, 550, 600, 650, 700, 750, 800, 850, 900, 950, 1,000, 1,050 and 1,110 $m^2/g$. For instance, electrodes of an IDI system generally have higher available capacities for desalination of lower salinity solutions. These higher available capacities may improve efficiency and/or lower wear on the electrodes. As another example, since IDI cells do not rely on high surface area electrodes to achieve relatively high capacity, DI cells may be less susceptible to fouling than the electrodes in a typical CDI cell. Also, intercalation compounds may selectively remove specific types of targeted ions from a solution stream, which is advantageous when the solution meets most but not all quality criteria for a given application.

A third alternative of an electrochemical deionization cell is a hybrid capacitive deionization (HCDI) cell. HCDI uses a cation intercalation host electrode and incorporates an anion exchange membrane for water desalination and cleaning process. The HCDI cell has one cation intercalation host electrode coupled with a carbon-based electrode (e.g., porous carbon, activated carbon, etc.) on the other side.

Figure 1:
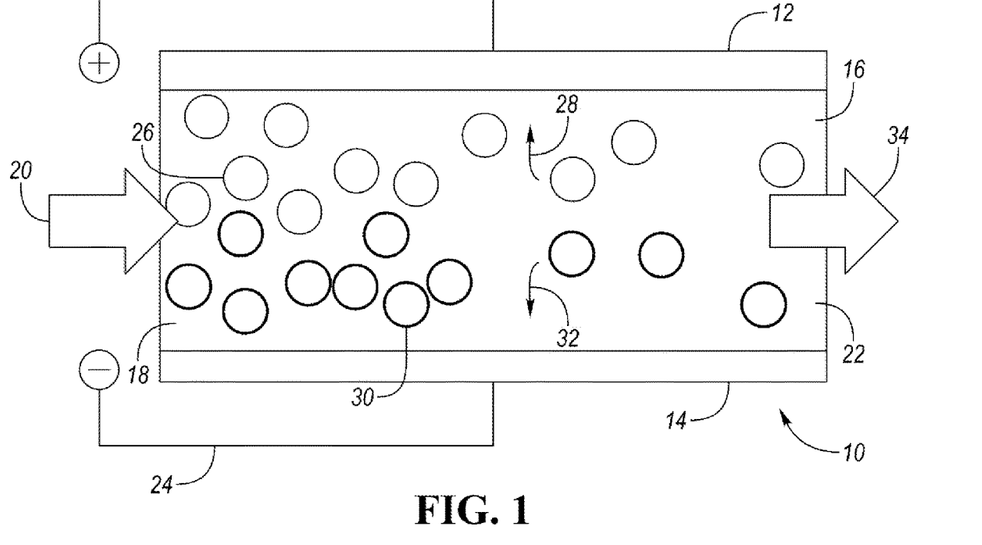
FIG. 1 depicts a schematic diagram of a capacitive deionization (CDI) cell.

FIG. 1 depicts a schematic diagram of capacitive deionization (CDI) cell 10. CDI cell 10 includes first carbon-based electrode 12, second carbon-based electrode 14, and compartment 16 extending therebetween. First and/or second carbon-based electrodes 12 and 14 may be formed of active carbon, mesoporous carbon, hierarchically porous carbon, carbon nanotubes, graphene, carbon aerogel, and combinations thereof. Compartment 16 includes inlet 18 configured to inlet a saline solution, as depicted by arrow 20. The saline solution may be brackish water or seawater. Force is applied to the saline solution so that it flows from inlet 18 to outlet 22 through compartment 16. The force may be applied by a pump.

As shown in FIG. 1, a power source through circuit 24 applies a current to generate a potential between first carbon-based electrode 12 and second carbon-based electrode 14 such that first carbon-based electrode 12 has a positive charge and second carbon-based electrode 14 has a negative charge. As the saline solution flows through compartment 16, anions 26 (e.g., chlorine anions) are attracted to and adsorbed on first carbon-based electrode 12 as depicted by arrow 28 and cations 30 (e.g., sodium cations) are attracted to and adsorbed on second carbon-based electrode 14 as depicted by arrow 32. First and/or second carbon-based electrodes 12 and 14 may have a high-surface area to maximize the number of ions that are adsorbed. The surface area of the electrode may be any of the following values or in a range of any two of the following values: 400, 450, 500, 550, 600, 650, 700, 750, 800, 850, 900, 950, 1,000, 1,050 and 1,110 $m^2/g$. By the time that the saline solution exits from outlet 22, the salinity of the solution is greatly reduced such that a fresh solution exits outlet 22 as depicted by arrow 34. The fresh solution may be a desalinated freshwater solution created from brackish water. Upon a polarity switch to circuit 24, adsorbed ion species are released back into the stream of the salinity solution, thereby creating a highly concentrated brine solution.

Figure 2A:
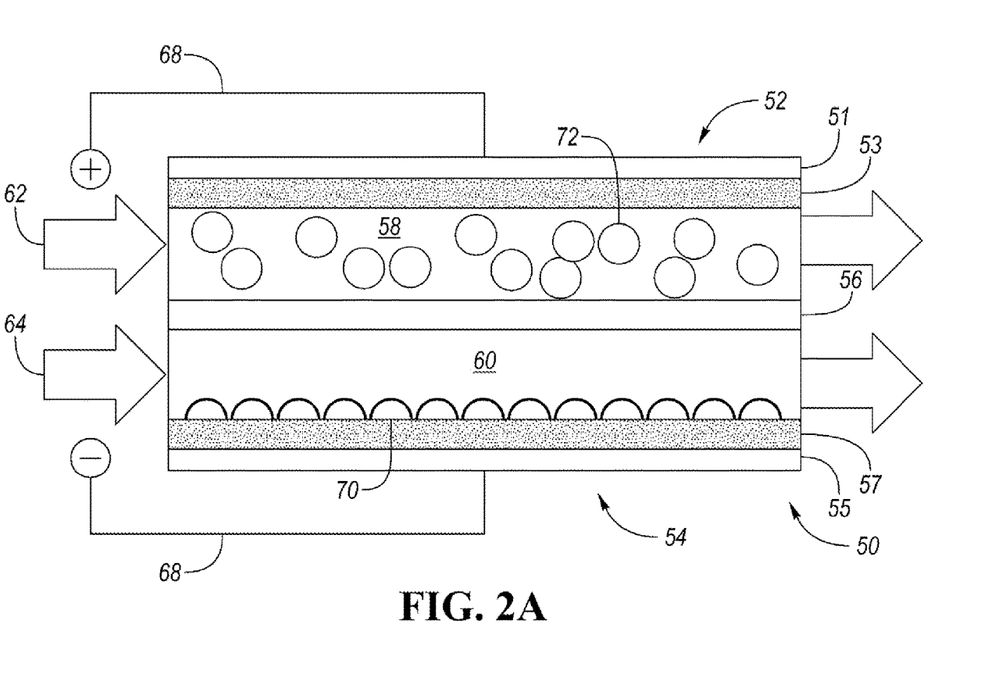
FIGS. 2a and 2b depict a schematic diagram of an intercalative desalination (IDI) cell.
Figure 2B:
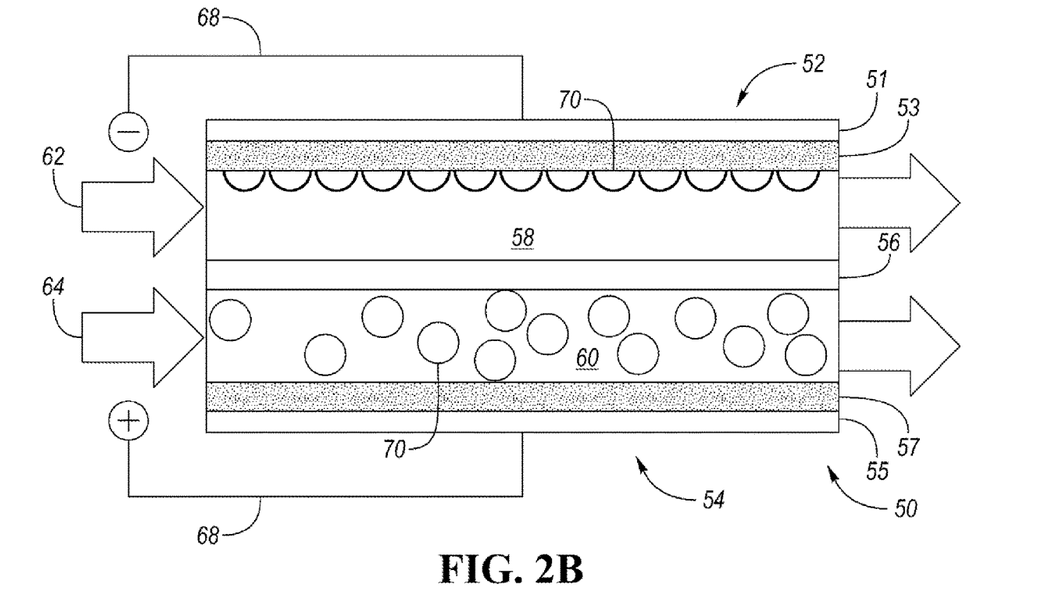

An IDI cell may be configured to simultaneously process of first and second saline solutions streams, such as first and second brackish water streams, to produce a diluted solution stream and a concentrated solution stream. FIGS. 2A and 2B depict a schematic diagram of IDI cell 50. An IDI cell includes first and second intercalation electrodes. First and second intercalation electrodes 52 and 54 are separated by anion exchange membrane 56. As a potential is applied to the first and second intercalation electrodes, cations from the substantially filled side are desorbed to create a brine solution stream, while cations in the adjacent compartment including the substantially empty electrode are removed from the feed solution by intercalating into the substantially empty electrode.

First intercalation electrode 52 includes first substrate 51 and first intercalation host 53 is applied to first substrate 51. Second intercalation electrode 54 includes second substrate 55 and second intercalation host 57 applied to second substrate 55. In one or more embodiments, an ion-selective membrane or an anion exchange member is placed between the surface of first and/or second intercalation electrodes 52 and 54 and the saline solution. This configuration permits released cations to recombine with anions from the opposite cell compartment. A water-permeable separator (not shown) may be used to prevent electrical contact between the first and second intercalation electrodes 52 and 54.

First compartment 58 is formed between first intercalation electrode 52 and anion exchange membrane 56. Second compartment 60 is formed between second intercalation electrode 54 and anion exchange membrane 56. As depicted by arrow 62, a first saline solution is fed into first compartment 58. As depicted by arrow 64, a second saline solution is fed into second compartment 60. The first and/or second saline solutions may be brackish water.

First and second intercalation electrodes 52 and 54 each have a state of charge (SOC) that changes continuously during operation. For example, first intercalation electrode 52 may start at 100% SOC and second intercalation electrode 54 at 0% SOC. As IDI cell 50 is operated, the SOC of first intercalation electrode 52 drops from 100% to 0% while the SOC of second intercalation electrode 54 rises from 0% to 100%. At the end of this "half cycle," the current (or voltage) is flipped and the cell runs in reverse, while being coordinated with the switching of valves, at least at the final outlets of IDI cell 50, such that the waste (brine) and purified streams continue to be provided as needed in IDI cell 50.

FIG. 2A depicts a first half-cycle operation of DI cell 50 and FIG. 2B depicts a second half-cycle operation of IDI cell 50. At the beginning of the first half-cycle operation, first intercalation electrode 52 is substantially empty and second intercalation electrode 54 is substantially full. During the first half-cycle operation, a power source through circuit 68 applies a current to generate an electric potential between first intercalation electrode 52 and second intercalation electrode 54 such that first intercalation electrode 52 has a positive charge and second intercalation electrode 54 has a negative charge. FIG. 2A shows a state in which cations 70 were released from first intercalation electrode 52 into first compartment 58, while cations 70 in second compartment 60 were intercalated into second intercalation electrode 54. During each half-cycle operation, anions 72 cross anion exchange membrane 56 to recombine with cations 70 released from one of first and second intercalation electrodes 52 and 54. IDI cell 50 is configured to supply a continuous stream of freshwater. When a saline solution (e.g., brackish water) is flowed through IDI cell 50 and a current is applied by a power source through circuit 68, calcium and/or magnesium cations are intercalated into first or second intercalation hosts 53 or 57, and anions (e.g., chlorine and carbonate anions) are accumulated in the opposite first or second compartment 58 or 60 by transporting through anion exchange membrane 56. The outlet solution from one of first or second compartment 58 or 60 is softened (e.g., contains a lower concentration of calcium and/or magnesium cations) while the other of first and second compartment 58 and 60 is enriched in salinity and is considered a wastewater stream.

Figure 3:
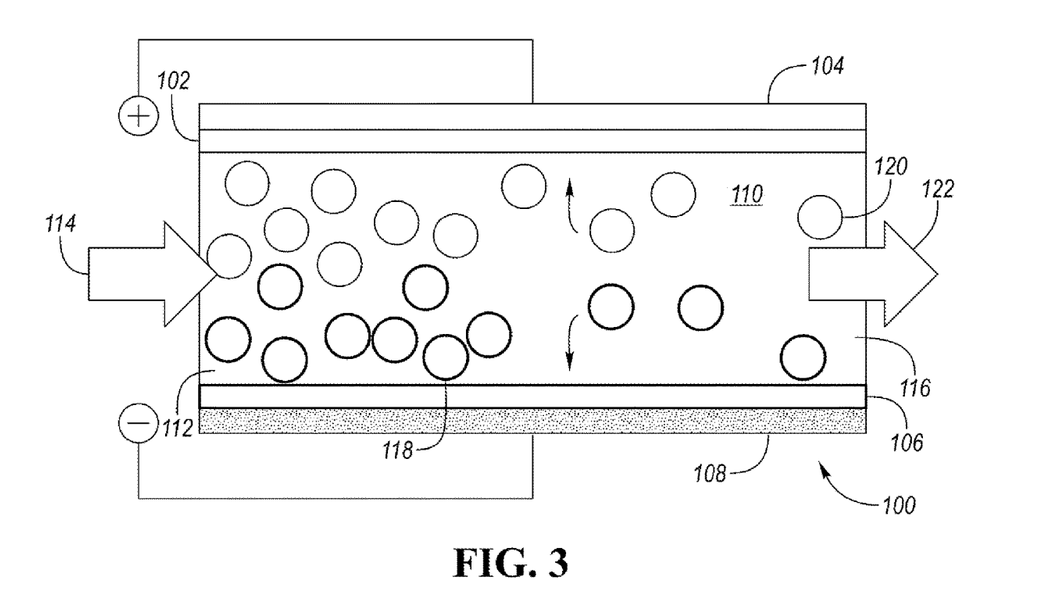
FIG. 3 depicts a schematic diagram of an example of a hybrid capacitive deionization (HCDI) cell.

FIG. 3 depicts a schematic diagram of hybrid capacitive deionization (HCDI) system 100. HCDI cell 100 includes anion exchange membrane 102 in a layer-to-layer configuration with carbon-based electrode 104. Anion exchange membrane 102 may contact carbon-based electrode 104. HCDI cell 100 includes cation exchange membrane 106 in a layer-to-layer configuration with intercalation host 108. Cation exchange membrane 106 may contact intercalation host 108. Compartment 110 is formed between spaced apart anion exchange membrane 102 and cation exchange membrane 106. HCDI cell 100 may be configured to desalinate and soften a saline solution based on a combination of ion intercalation and electro-adsorption.

Compartment 110 includes inlet 112 configured to inlet a saline solution, as depicted by arrow 114. The saline solution may be brackish water or seawater. Force is applied to the saline solution so that it flows from inlet 112 to outlet 116 through compartment 110, as depicted by arrow 122. Cations 118 within the feed saline solution stream are removed through intercalation, while anions 120 are adsorbed on carbon-based electrode 104. Anion exchange membrane 102 is configured to increase efficiency by decreasing co-ion adsorption (e.g., co-ion adsorption on carbon-based electrode 104). The saline solution is only desalinated during one half-cycle due to the non-symmetric nature of HCDI cell 100.

While the deionization systems disclosed above are adequate for removing ions from a solution stream, there remains a need to improve deionization systems with a thermal management system. In one or more embodiments, thermal management systems are employed with deionization systems to realize one or more benefits. The thermal management system may be configured to maintain an operating temperature range of the solution in the one or more compartments of each cell and/or cell module within the deionization system. The operating temperature range may be selected such that an upper limit of the temperature range does not exceed a temperature that may cause premature thermal degradation of one or more of the cell components. The desired temperature range may be selected such that a lower limit of the temperature range is high enough to facilitate fast reaction kinetics and/or avoid parasitic reactions.

In a CDI or IDI system, first and second water streams flow sequentially through a series of CDI or IDI cells, respectively, with one or more target ion concentrations (e.g., dissolved salt concentration) of one stream decreasing (e.g., continuously decreasing) within a given cell and from upstream cells to downstream cells and one or more target ion concentrations (e.g., dissolved salt concentration) of the other stream increasing (e.g., continuously increasing) as current is simultaneously passed through the one or more cells or cell stack.

Inherent impedances (e.g., ohmic, kinetic, and diffusive impedances) exist with the electrochemical deionization systems (e.g., CDI, IDI, and HCDI systems) that result in energy inefficiency and/or generation of waste heat. Moreover, when these electrochemical deionization systems involve convective fluid flow, heat is generated due to friction between the moving fluid and stationary solid components of the electrochemical deionization systems. Due to this friction, the temperature of the fluids in the system tend to increase from the inlet of the first cell to the outlet of the last cell.

Relatively low fluid temperatures tend to result in higher electrochemical impedance, and therefore, may result in high rates of heat generation. Moreover, these high impedances tend to increase the driving force for parasitic side reactions, such as $H_2$ and $O_2$ generation in aqueous systems. Parasitic side reactions may decrease system efficiency further and may result in drift in the balance between electrode capacities (e.g., can reduce the effective cell capacity over time), and in the worst case can drive premature aging of the system. In addition, scaling of the system due to precipitation of calcium carbonate or other salts can inactivate the surface of the electrode over time, and this precipitation occurs at a lower salt concentration when the temperature is relatively low. Therefore, there are some advantages to avoiding too low of an operating temperature. On the other hand, increasing the temperature of the system too high can drive other unwanted degradation mechanisms (e.g., thermally driven parasitic reactions, dissolution of active materials, etc.).

Therefore, it is desirable to maintain an operating temperature range throughout the electrochemical deionization system to prolong the lifetime of the system and increase the overall performance of the system. One or more embodiments, an electrochemical deionization system is provided that maintains such an operating temperature range of the fluids (e.g., seawater or brackish water) flowing through the cells of the electrochemical deionization system.

Figure 4:
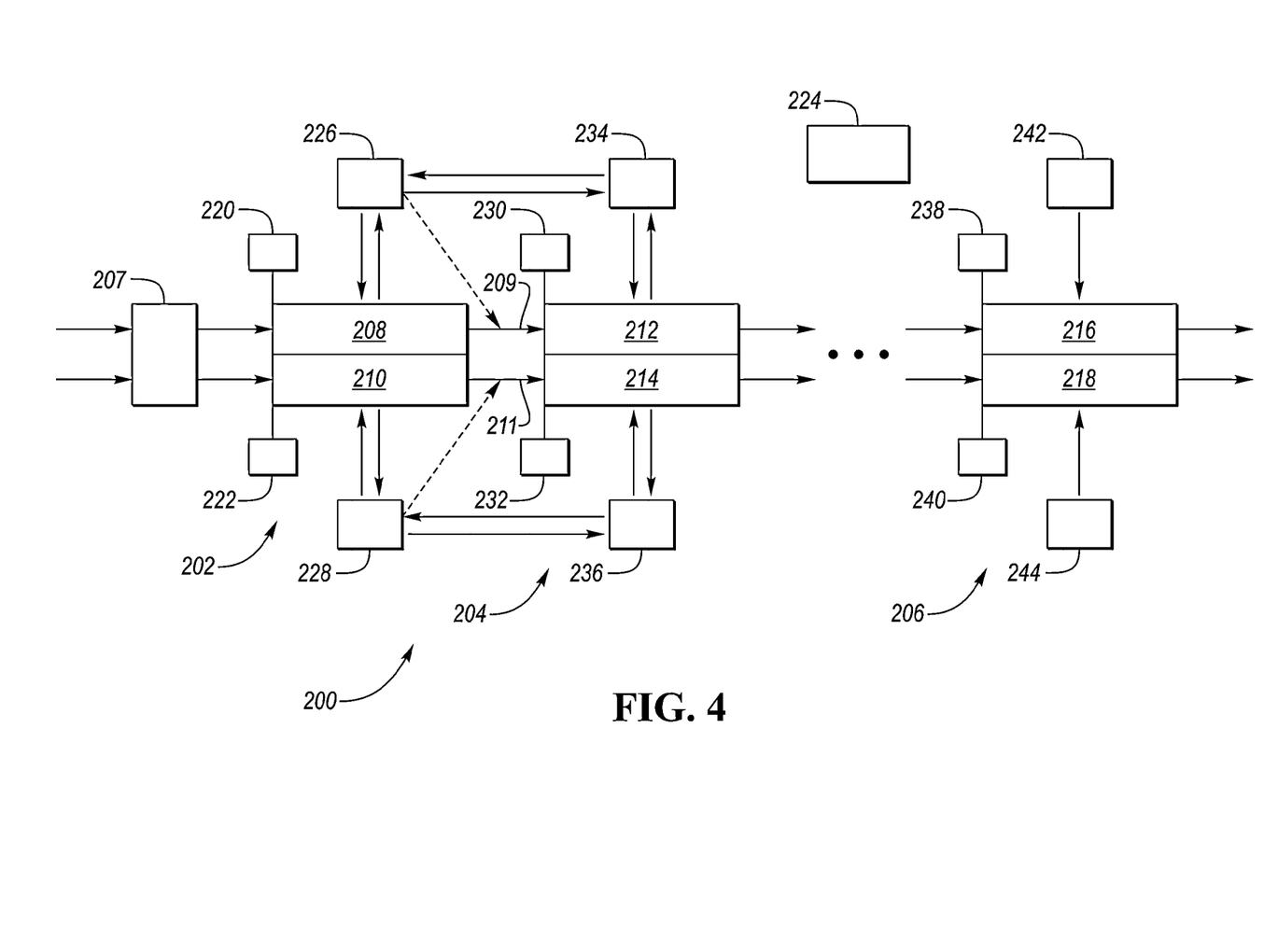
FIG. 4 depicts a schematic diagram of an electrochemical deionization system according to one embodiment.

FIG. 4 depicts electrochemical deionization system 200 according to one embodiment. Electrochemical deionization system 200 includes first cell 202, second cell 204, and nth cell 206. Electrochemical desalination system 200 may have several cells positioned between second cell 204 and nth cell 206. As shown in FIG. 4, cells 202, 204, and 206 are arranged in series. In one or more embodiments, cells may be arranged in series, parallel, or a combination thereof.

First cell 202 includes first and second compartments 208 and 210. Second cell 204 includes first and second compartments 212 and 214. Nth cell 206 includes first and second compartments 216 and 218. A first fluid stream flows through first compartments 208, 212, and 216 of first, second, and nth cells 202, 204, and 206, respectively. A second fluid stream flows through second compartments 210, 214, and 218 of first, second, and nth cells 202, 204, and 206, respectively. Although FIG. 4 depicts a co-flow arrangement within cells 202, 204, and 206, counterflow and cross-flow arrangements may be implemented in one or more embodiments. Although FIG. 4 depicts electrochemical deionization system 200 as an IDI system with cells each having two compartments, the thermal management system and process of one or more embodiments may be applied to other electrochemical desalination systems with one compartment cells such as CDI systems and HCDI systems.

First and second temperature sensors 220 and 222 are connected to first and second compartments 208 and 210, respectively, of first cell 202. First and second temperature sensors 220 and 222 are configured to sense data indicative of a temperature of the fluid flowing through first and second compartments 208 and 210, respectively, of first cell 202. As shown in FIG. 4, first and second temperature sensors 220 and 222 are arranged at or near the inlet of first and second compartments 208 and 210, respectively, of first cell 202. In other embodiments, these temperature sensors may be positioned in a middle portion of the compartments or at or near the outlet of the compartments. In some embodiments, more than one sensor may be connected to a compartment to sense data indicative of a temperature of the fluid flowing through the compartment at two or more locations along the length or other dimension of the compartment. First and second temperature sensors 220 and 222 are electrically connected to controller 224. First and second temperature sensors 220 and 222 may be wirelessly connected to controller 224. In other embodiments, first and second temperature sensors 220 and 222 are each wired to controller 224.

First and second thermal devices 226 and 228 are configured to heat and/or cool the fluid flowing through first and second compartments 208 and 210, respectively, to increase or decrease the temperature of the fluid flowing through first and second compartments 208 and 210, respectively. In one or more embodiments, first and second thermal devices 226 and 228 are configured to evenly heat and/or cool the entire volume of fluid contained within first and/or second compartments 208 and 210, respectively, of first cell 202. First and/or second thermal devices 226 and 228 may be internal to first and second compartments 208 and 210, respectively, of first cell 202. For instance, the thermal device may be a heat exchanger with coils configured to flow fluid therethrough at a temperature different than a temperature of the fluid flowing through the compartment. First and/or second thermal devices 226 and 228 may be external to first and second compartments 208 and 210, respectively. First and/or second heating devices 226 and 228 may also be used to heat and/or cool fluid flowing in pipes (e.g., pipes 209 and 211) between the compartments of adjacent cells or cell modules. First and/or second thermal devices 226 and 228 are electrically connected to controller 224. First and/or second thermal devices 226 and 228 may be wirelessly connected to controller 224. In other embodiments, first and/or second thermal devices 226 and 228 are each wired to controller 224.

First and second temperature sensors 230 and 232 are connected to first and second compartments 212 and 214, respectively, of second cell 204. First and second temperature sensors 230 and 232 are configured to sense data indicative of a temperature of the fluid flowing through first and second compartments 212 and 214, respectively, of second cell 204. As shown in FIG. 4, first and second temperature sensors 230 and 232 are arranged at or near the inlet of first and second compartments 212 and 214, respectively, of second cell 204. In other embodiments, these temperature sensors may be positioned in a middle portion of the compartments or at or near the outlet of the compartments. In some embodiments, more than one sensor may be connected to a compartment to sense data indicative of a temperature of the fluid flowing through the compartment at two or more locations along the length or other dimension of the compartment. First and second temperature sensors 230 and 232 are electrically connected to controller 224. First and second temperature sensors 230 and 232 may be wirelessly connected to controller 224. In other embodiments, first and second temperature sensors 230 and 232 are each wired to controller 224.

First and second thermal devices 234 and 236 are configured to heat and/or cool the fluid flowing through first and second compartments 212 and 214, respectively, to increase or decrease the temperature of the fluid flowing through first and second compartments 212 and 214, respectively. In one or more embodiments, first and second thermal devices 234 and 236 are configured to evenly heat or cool the entire volume of fluid contained within first and/or second compartments 212 and 214, respectively. First and/or second thermal devices 226 and 228 may be internal to first and second compartments 208 and 210, respectively. For instance, a thermal device may be a heat exchanger with coils configured to flow fluid therethrough at a temperature different than a temperature of the fluid flowing through the compartment. First and/or second thermal devices 234 and 236 may be external to first and second compartments 212 and 214, respectively. First and/or second thermal devices 226 and 228 may also be used to heat and/or cool fluid flowing in pipes between the compartments of adjacent cells or cell modules. First and/or second thermal devices 234 and 236 are electrically connected to controller 224. First and/or second thermal devices 234 and 236 may be wirelessly connected to controller 224. In other embodiments, first and/or second thermal devices 234 and 236 are each wired to controller 224.

First and second temperature sensors 238 and 240 are connected to first and second compartments 216 and 218, respectively, of nth cell 206. First and second temperature sensors 238 and 240 are configured to sense data indicative of a temperature of the fluid flowing through first and second compartments 216 and 218, respectively, of nth cell 206. As shown in FIG. 4, first and second temperature sensors 238 and 240 are arranged at or near the inlet of first and second compartments 216 and 218, respectively, of nth cell 206. In other embodiments, these temperature sensors may be positioned in a middle portion of the compartments or at or near the outlet of the compartments. In some embodiments, more than one sensor may be connected to a compartment to sense data indicative of a temperature of the fluid flowing through the compartment at two or more locations along the length or other dimension of the compartment. First and second temperature sensors 238 and 240 are electrically connected to controller 224. First and second temperature sensors 238 and 240 may be wirelessly connected to controller 224. In other embodiments, first and second temperature sensors 238 and 240 are each wired to controller 224.

First and second thermal devices 242 and 244 are configured to heat and/or cool the fluid flowing through first and second compartments 216 and 218, respectively, to increase or decrease the temperature of the fluid flowing through first and second compartments 216 and 218, respectively. In one or more embodiments, first and second thermal devices 242 and 244 are configured to evenly heat or cool the entire volume of fluid contained within first and/or second compartments 216 and 218, respectively. First and/or second thermal devices 242 and 244 may be internal to first and second compartments 242 and 244, respectively. For instance, a thermal device may be a heat exchanger configured to flow fluid therethrough at a temperature different than a temperature of the fluid flowing through the compartment. First and/or second thermal devices 242 and 244 may be external to first and second compartments 216 and 218, respectively. First and/or second thermal devices 242 and 244 may also be used to heat and/or cool fluid flowing in pipes between the compartments of adjacent cells or cell modules. First and/or second thermal devices 242 and 244 are electrically connected to controller 224. First and/or second thermal devices 242 and 244 may be wirelessly connected to controller 224. In other embodiments, first and/or second thermal devices 242 and 244 are each wired to controller 224.

In one embodiment, first and second inlet fluid streams may be heated using a heating device 207 before admitting the first and second inlet fluid streams into first and second compartments 208 and 210. The first and second inlet fluid streams may be heated with an electric heater. The first and second inlet fluid streams may be heated to a temperature within a pre-heating temperature range. The pre-heating temperature range may be any of the following temperatures: 40, 45, 50, 55, 60, 65, 70, 75, 80, and 85° C. The pre-heated fluid may be cooled using one or more cooling devices as the fluid flows through the cells or modules (e.g., a grouping of two or more stacked cells) of the deionization system. The fluid may be cooled at a predetermined time interval between cells or modules that are connected in series. The predetermined time interval may be any of the following values or in a range of any two of the following values: 1 second, 15 seconds, 30 seconds, 45 seconds, 1 minute, 2 minutes, 3 minutes, 4 minutes, 5 minutes, 6 minutes, 7 minutes, 8 minutes, 9 minutes, 10 minutes, 11 minutes, 12 minutes, 13 minutes, 14 minutes, and 15 minutes. Other intervals of operation may be utilized. Cooling may be triggered when a temperature based on a sensor reading exceeds a particular set point, which may also depend on a salt concentration. When the temperature drops to a second temperature (which may be a function of concentration), then cooling is paused.

One or more temperature sensors (e.g., temperature sensors 220, 222, 230, 232, 238, and 240) may be used to sense a temperature of the fluid flowing at different locations of the deionization system. The one or more sensed temperatures from the one or more temperature sensors may be transmitted to controller 224. Controller 224 may have memory to store one or more thermal models (e.g., one or more estimation algorithms) configured to estimate an actual temperature range of the fluid flowing the cells of the deionization system in response to receiving the sensed temperature values. The actual temperature range may include a temperature profile of the entire fluid flow path (e.g., all cells of the deionization system) or a portion thereof (e.g., one or more compartments of one or more cells of the deionization system). Controller 224 may have a processor to increase or decrease the heating and/or cooling rates of the deionization system 200 in response to the actual temperature range. For instance, controller 224 may transmit a signal to adjust (e.g., increase, decrease, and/or maintain) the flow rate of the heating and/or cooling fluids in response to the actual temperature range. As another example, controller 224 may transmit a signal to adjust (e.g., increase, decrease, and/or maintain) a heating rate of a heating device (e.g., an electric or combustion heating device) in response to the actual temperature range. Yet another example is adjusting (e.g., increase, decrease, and/or maintain) a cooling rate of a cooling device (e.g., a second-state compressor) in response to the actual temperature range. The fluid flowing through the compartment(s) of the deionization system are controlled to be maintained at a lower temperature threshold where higher electrochemical impedances are not encountered or is minimized. The lower temperature threshold may be any of the following values or in a range of any two of the following values: 0, 1, 2, 3, 4, 5, 6, 7, 8, 9, 10, 11, 12, 13, 14, 15, 16, 17, 18, 19, and 20° C. This process may also maintain a narrower operating temperature range with an upper limit to avoid overheating the fluids to a point where unwanted degradation mechanisms (e.g., thermally driven parasitic reactions, dissolution of active materials, etc.)

In another embodiment, a thermal management system includes exchanging heat from fluid flowing through intermediate, downstream cells with fluid flowing through the inlet cell or intermediate, upstream cells. The fluid flowing through one or more intermediate, downstream cells has an elevated temperature range higher than a lower temperature range of fluid flowing through one or more inlet or intermediate, upstream cells. The elevated temperature of the fluid flowing through one or more intermediate, downstream cells pre-heats the fluid flowing through one or more inlet or intermediate, upstream cells, while simultaneously reducing the temperature of the fluid flowing through one or more intermediate, downstream cells to within an acceptable temperature range and below a maximum desired temperature. In one embodiment, a heat exchanger may be used to move heat directly from a downstream fluid to an upstream fluid. In another embodiment, a separate fluid circuit with two heat exchangers is used. One of the heat exchangers removes heat from a downstream fluid and the other adds heat to an upstream fluid. Another embodiment is a system and method of increasing the temperature of the inlet streams by fluid recirculation, either before the first cell or from the outlet to the inlet of the first cell, thereby leveraging the friction of the fluid to heat it.

The acceptable operating temperature range for each cell or module may depend on the average salt concentration in each stream at that point in the series of cells or modules. For example, downstream in the series, the purification stream has a lower salt concentration relative to the source water, while the waste stream has a higher salt concentration. Water with these more extreme salt concentrations relative to the source water tends to have higher electrochemical resistance and increasing the temperature beyond the upper limit of an operating temperature range for the first cell or module in the series may be advantageous to reduce this resistance and avoid precipitation (e.g., salting out) in the waste stream and $H_2$ evolution in the purification stream. Including recirculation loops in the downstream cells or modules is one approach to increasing the temperature due to friction losses.

The electrochemical deionization system of one or more embodiments may have one or more sensors configured to sense data indicative of concentrations of one or more target ions of one or more cells or cell modules. The sensed data may be transmitted to controller 224. Controller 224 may use the sensed concentration data, along with the sensed temperatures, and a thermal model and/or estimation algorithm, to determine an acceptable operating temperature range.

In one or more applications, water is softened or otherwise purified as well as heated to a desired operating temperature. For example, water used in a dishwasher or clothes washer is often hot or heated to improve cleaning or sanitization, or to provide a comfortable temperature for bathing. These temperatures may not be acceptable for the durability and performance of the deionization device. Therefore, the deionization systems of one or more embodiments may include a thermal treatment module configured to heat an effluent purification stream to a second temperature range acceptable for an end application. In one embodiment, fluid entering the deionization device may be cooled and then reheated upon exit. In a whole-home softening system, a water softener may be located before a hot water heater to avoid excessive temperatures and improve the durability of the hot water heater and may be integrated thermally with the hot water heater to optimize temperatures throughout the deionization system.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications. Applications for the deionization systems of one or more embodiments include water desalination (e.g., converting brackish or saltwater to purified water for drinking, agriculture, industrial applications, power generation, electrolysis, etc.) and water softening (e.g., targeted removal of hard ions such as calcium and magnesium) to improve durability of pipes and appliances that use water (e.g., dishwashers or steam ovens).

What is claimed is:

1. An electrochemical deionization system for removing ions from a solution stream, the system comprising:
    an upstream capacitive deionization cell having at least one upstream compartment including an upstream compartment inlet and an upstream compartment outlet and configured to flow the solution stream between the upstream compartment inlet and the upstream compartment outlet;
    a downstream capacitive deionization cell having at least one downstream compartment including a downstream compartment inlet and a downstream compartment outlet and configured to flow the solution stream between the downstream compartment inlet and the downstream compartment outlet, the at least one upstream compartment in fluid communication with the at least one downstream compartment;
    a first thermal device configured to heat the solution stream before entering the at least one upstream compartment to an elevated temperature; and
    a second thermal device configured to cool the solution stream before entering the at least one downstream compartment to a reduced temperature less than the elevated temperature, the reduced and elevated temperatures are in an operating temperature range of the electrochemical deionization system in which one or more electrochemical impedances and one or more degradation mechanisms effects are reduced within the operating temperature range.

2. The electrochemical deionization system of claim 1, wherein the second thermal device is configured to cool the solution stream after exiting the upstream compartment outlet.

3. The electrochemical deionization system of claim 1, wherein the first thermal device is part of a fluid heat exchanger device configured to flow at least a portion of the solution stream from the downstream capacitive deionization cell through the fluid heat exchanger device in thermal communication with the upstream capacitive deionization cell.

4. The electrochemical deionization system of claim 3, wherein the second thermal device is part of the fluid heat exchanger device configured to return the at least the portion of the solution stream from the downstream capacitive deionization cell after thermal communication with the upstream capacitive deionization cell.

5. The electrochemical deionization system of claim 3, wherein the first thermal device is configured to recirculate the portion of the solution stream from the downstream capacitive deionization cell in the solution stream of the upstream device.

6. The electrochemical deionization system of claim 1, wherein the first thermal device is a first fluid heat exchanger device configured to add heat to the solution stream flowing through the upstream capacitive deionization cell and the second thermal device is a second fluid heat exchanger device configured to remove heat from the solution stream flowing through the downstream capacitive deionization cell.

7. The electrochemical deionization system of claim 1, wherein the upstream and downstream capacitive deionization cells are arranged in series.

8. An electrochemical deionization system for removing ions from a solution stream, the system comprising:
    an upstream intercalative desalination cell having at least one upstream compartment including an upstream compartment inlet and an upstream compartment outlet and configured to flow the solution stream between the upstream compartment inlet and the upstream compartment outlet;
    a downstream intercalative desalination cell having at least one downstream compartment including a downstream compartment inlet and a downstream compartment outlet and configured to flow the solution stream between the downstream compartment inlet and the downstream compartment outlet, the at least one upstream compartment in fluid communication with the at least one downstream compartment;
    a first thermal device configured to heat the solution stream before entering the at least one upstream compartment to an elevated temperature; and
    a second thermal device configured to cool the solution stream before entering the at least one downstream compartment to a reduced temperature less than the elevated temperature, the reduced and elevated temperatures are in an operating temperature range of the electrochemical deionization system in which one or more electrochemical impedances and one or more degradation mechanisms effects are reduced within the operating temperature range.

9. The electrochemical deionization system of claim 8, wherein the second thermal device is configured to cool the solution stream after exiting the upstream compartment outlet.

10. The electrochemical deionization system of claim 8, wherein the first thermal device is part of a fluid heat exchanger device configured to flow at least a portion of the solution stream from the downstream intercalative desalination cell through the fluid heat exchanger device in thermal communication with the upstream intercalative desalination cell.

11. The electrochemical deionization system of claim 10, wherein the second thermal device is part of the fluid heat exchanger device configured to return the at least the portion of the solution stream from the downstream intercalative desalination cell after thermal communication with the upstream intercalative desalination cell.

12. The electrochemical deionization system of claim 10, wherein the first thermal device is configured to recirculate the portion of the solution stream from the downstream intercalative desalination cell in the solution stream of the upstream device.

13. The electrochemical deionization system of claim 8, wherein the first thermal device is a first fluid heat exchanger device configured to add heat to the solution stream flowing through the upstream intercalative desalination cell and the second thermal device is a second fluid heat exchanger device configured to remove heat from the solution stream flowing through the downstream intercalative desalination cell.

14. The electrochemical deionization system of claim 8, wherein the upstream and downstream intercalative desalination cells are arranged in series.

15. An electrochemical deionization system for removing ions from a solution stream, the system comprising:
    an upstream hybrid capacitive deionization cell having at least one upstream compartment including an upstream compartment inlet and an upstream compartment outlet and configured to flow the solution stream between the upstream compartment inlet and the upstream compartment outlet;
    a downstream hybrid capacitive deionization cell having at least one downstream compartment including a downstream compartment inlet and a downstream compartment outlet and configured to flow the solution stream between the downstream compartment inlet and the downstream compartment outlet, the at least one upstream compartment in fluid communication with the at least one downstream compartment;
    a first thermal device configured to heat the solution stream before entering the at least one upstream compartment to an elevated temperature; and
    a second thermal device configured to cool the solution stream before entering the at least one downstream compartment to a reduced temperature less than the elevated temperature, the reduced and elevated temperatures are in an operating temperature range of the electrochemical deionization system in which one or more electrochemical impedances and one or more degradation mechanisms effects are reduced within the operating temperature range.

16. The electrochemical deionization system of claim 15, wherein the second thermal device is configured to cool the solution stream after exiting the upstream compartment outlet.

17. The electrochemical deionization system of claim 15, wherein the first thermal device is part of a fluid heat exchanger device configured to flow at least a portion of the solution stream from the downstream hybrid capacitive deionization cell through the fluid heat exchanger device in thermal communication with the upstream hybrid capacitive deionization cell.

18. The electrochemical deionization system of claim 17, wherein the second thermal device is part of the fluid heat exchanger device configured to return the at least the portion of the solution stream from the downstream hybrid capacitive deionization cell after thermal communication with the upstream hybrid capacitive deionization cell.

19. The electrochemical deionization system of claim 17, wherein the first thermal device is configured to recirculate the portion of the solution stream from the downstream hybrid capacitive deionization cell in the solution stream of the upstream device.

20. The electrochemical deionization system of claim 15, wherein the first thermal device is a first fluid heat exchanger device configured to add heat to the solution stream flowing through the upstream hybrid capacitive deionization cell and the second thermal device is a second fluid heat exchanger device configured to remove heat from the solution stream flowing through the downstream hybrid capacitive deionization cell.

* * * * *